(12) United States Patent
Hayashi et al.

(10) Patent No.: US 9,121,593 B2
(45) Date of Patent: Sep. 1, 2015

(54) LIGHTING APPARATUS AND LIGHTING APPARATUS ASSEMBLY USING THE SAME

(71) Applicant: Panasonic Corporation, Osaka (JP)

(72) Inventors: Yohei Hayashi, Osaka (JP); Hirofumi Konishi, Osaka (JP); Osamu Tanahashi, Kyoto (JP); Hideharu Kawachi, Hyogo (JP); Masanao Okawa, Nara (JP); Koji Noro, Osaka (JP); Ryusuke Kotera, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 2 days.

(21) Appl. No.: 13/962,418

(22) Filed: Aug. 8, 2013

(65) Prior Publication Data

US 2014/0071680 A1 Mar. 13, 2014

(30) Foreign Application Priority Data

Sep. 13, 2012 (JP) ................. 2012-201163

(51) Int. Cl.
*F21V 21/14* (2006.01)
*H05B 33/08* (2006.01)

(52) U.S. Cl.
CPC ............... *F21V 21/14* (2013.01); *H05B 33/08* (2013.01); *H05B 33/0803* (2013.01); *Y02B 20/325* (2013.01)

(58) Field of Classification Search
CPC .................. F21V 21/34–21/35; F21V 19/004; H01R 27/00
USPC .................. 439/263, 264, 110–120; 362/396, 362/217.12, 217.13, 217.16, 217.17, 640, 362/219
See application file for complete search history.

(56) References Cited

U.S. PATENT DOCUMENTS 2,361,721 A * 10/1944 Van Deventer ............... 439/120
2,781,497 A * 2/1957 Sheskier ....................... 439/120
(Continued)

FOREIGN PATENT DOCUMENTS

JP 56-69071 U 6/1981
JP 2007-034240 A 2/2007
(Continued)

OTHER PUBLICATIONS

Office Action for corresponding Chinese Application No. 201310418344.X dated Mar. 23, 2015 and English translation.

*Primary Examiner* — Jong-Suk (James) Lee
*Assistant Examiner* — Christopher E Dunay
(74) *Attorney, Agent, or Firm* — Renner, Otto, Boisselle & Sklar, LLP

(57) ABSTRACT

A lighting apparatus includes a light-emission unit having plate shape; and a base unit configured to be detachably attached thereto the light-emission unit. The base unit has substantially rectangular shape. The base unit includes a power supply rail for supplying electricity to the light-emission unit and a support section supporting the light-emission unit. The power supply rail has rail-shape and extending in a longitudinal direction of the base unit. The light-emission unit includes a luminescent panel, a control circuit configured to control lighting of the luminescent panel and an electrically conductive connection terminal electrically connecting the control circuit to the power supply rail. The base unit is formed so as to be capable of being attached thereto a plurality of the light-emission units along the longitudinal direction of the base unit. The connection terminal is connected to an arbitrary point of the rail-shaped power supply rail.

15 Claims, 9 Drawing Sheets

(56) References Cited

U.S. PATENT DOCUMENTS

| | | | |
|---|---|---|---|
| 5,328,392 A * | 7/1994 | Lin et al. | 439/833 |
| 7,556,511 B1 * | 7/2009 | Hsu et al. | 439/119 |
| 2003/0219997 A1 * | 11/2003 | Ekkul et al. | 439/76.1 |
| 2006/0166536 A1 * | 7/2006 | Northey et al. | 439/188 |
| 2010/0214747 A1 * | 8/2010 | Jacobs et al. | 361/729 |
| 2012/0094512 A1 * | 4/2012 | Northey | 439/116 |
| 2013/0058091 A1 * | 3/2013 | Hast et al. | 362/249.04 |
| 2014/0226325 A1 * | 8/2014 | Allen et al. | 362/231 |

FOREIGN PATENT DOCUMENTS

| | | |
|---|---|---|
| JP | 2009-140669 A | 6/2009 |
| JP | 4835890 B1 | 12/2011 |
| JP | 2012-104504 A | 5/2012 |
| WO | WO 2004/011849 A1 | 2/2004 |

* cited by examiner

LIGHTING APPARATUS AND LIGHTING APPARATUS ASSEMBLY USING THE SAME

TECHNICAL FIELD

The invention relates generally to a lighting apparatus including a light-emission unit having plate shape, and more particularly, to a lighting apparatus including an organic electroluminescence device as a light source having plate shape.

BACKGROUND ART

It has been known that an organic electroluminescence device has advantages that: it can emit high-brightness light with a low supply voltage; it can achieve various emission colors by changing the kinds of organic compound; and it is easy to be manufactured in a form of a luminescent panel having plate shape. It therefore deserves considering to employ the organic electroluminescence device as a light source of a lighting apparatus.

As such kinds of lighting apparatus, JP2012-104504A discloses a lighting apparatus including: light-emission units each including an organic electroluminescence device as a light source; a base unit supporting the light-emission unit; and electrodes that are fixed to the base unit so as to supply electricity therethrough to the light-emission unit.

However, this lighting apparatus has a disadvantage that it has few degrees of freedom for an arrangement of the light-emission units, because fixed positions of the electrodes on the base unit restrict arrangements of the light-emission units.

DISCLOSURE OF INVENTION

The invention is developed in view of above problem, and it is an object of the invention to provide a lighting apparatus that has a higher degree of freedom for an arrangement of a light-emission unit shaped like a plate, and that is excellent in design.

A lighting apparatus of the invention includes: a light-emission unit having plate shape; and a base unit configured to be detachably attached thereto the light-emission unit. The base unit has substantially rectangular shape. The base unit includes: a power supply rail for supplying electricity to the light-emission unit therethrough; and a support section supporting the light-emission unit. The power supply rail has rail-shape and extends in a longitudinal direction of the base unit. The light-emission unit includes: a luminescent panel; a control circuit configured to control lighting of the luminescent panel; and an electrically conductive connection terminal for electrically connecting the control circuit and the power supply rail. The base unit is formed so that a plurality of the light-emission units are attachable thereto along the longitudinal direction of the base unit. At least a part (whole) of the power supply rail is electrically connectable to the connection terminal, and the connection terminal is connected to an arbitrary point of the rail-shaped power supply rail.

In one embodiment, the base unit has substantially rectangular shape so as to have a first long side and a second long side along the longitudinal direction thereof. The support section includes a holding element and an engaging element. The holding element is provided at a side of the first long side continuously or discontinuously. The engaging element is provided at a side of the second long side continuously or discontinuously. The light-emission unit includes a held element to be held by the holding element and an engaged element to be engaged with the engaging element. The engaged element is elastically biased in a direction substantially perpendicular to the longitudinal direction of the base unit at the side of the second long side, whereby the engaged element is engaged with the engaging element.

In one embodiment, the holding element and the engaging element are formed to have asymmetric shape with each other with respect to a center line in the longitudinal direction of the base unit.

In one embodiment, the base unit has a length equal to the integer multiple of a length of the light-emission unit in the longitudinal direction.

In one embodiment, the light-emission unit includes a power supply connector that has: the connection terminal; and a pair of clamp pieces sandwiching and holding therebetween a part of the power supply rail. The light-emission unit is attached to the base unit by the paired clamp pieces holding the power supply rail and the connection terminal being connected to the power supply rail.

In one embodiment, the connection terminal includes: an anode terminal; and a cathode terminal. The power supply rail includes: an electrically conductive anode rail to be electrically connected to the anode terminal; an electrically conductive cathode rail to be electrically connected to the cathode terminal; and an electrically insulating cover rail that houses therein the anode rail and the cathode rail. The cover rail has a pair of grooves extending in the longitudinal direction of the base unit and housing therein respectively the anode rail and the cathode rail so as to be insulated from each other. The paired clamp pieces hold the cover rail in which the anode rail and the cathode rail are housed.

In one embodiment, the connection terminal includes: an anode terminal; and a cathode terminal. The power supply rail includes: an electrically conductive anode rail to be electrically connected to the anode terminal; an electrically conductive cathode rail to be electrically connected to the cathode terminal; and an electrically insulating cover rail that houses therein the anode rail and the cathode rail.

In one embodiment, the cover rail has a pair of grooves extending in the longitudinal direction of the base unit and housing therein respectively the anode rail and the cathode rail so as to be insulated from each other. The clamp pieces include: a pair of anode rail clamp pieces holding directly the anode rail; and a pair of cathode rail clamp pieces holding directly the cathode rail.

In one embodiment, the paired clamp pieces are made of conductive material.

In one embodiment, the anode rail and the cathode rail each is made by bending a conductive plate to be shaped like a plate spring, and the anode rail and the cathode rail each has a plurality of slits extending in a depth direction of the groove.

In one embodiment, the plurality of slits are spaced with each other at a predetermined interval. The connection terminal has a width, in the longitudinal direction of the base unit, which is equal to the integer multiple of the interval between the adjacent slits.

In one embodiment, the clamp piece has a width, in a direction perpendicular to the longitudinal direction of the base unit, which is smaller toward a bottom of the power supply rail.

In one embodiment, the light-emission unit has a front surface constituting a light emission surface and a back surface constituting an attachment surface. The power supply connector is provided on the attachment surface.

In one embodiment, the power supply rail further includes a communication wire transmitting therethrough a control signal to the control circuit.

In one embodiment, the light-emission unit includes an organic electroluminescence device as a light source.

A plurality of above-described lighting apparatuses are preferably connected to form a lighting apparatus assembly.

According to the invention, it is possible to provide a lighting apparatus that has a higher degree of freedom for an arrangement and that is excellent in design, since the light-emission unit can be arranged at desired position on the base unit.

DESCRIPTION OF EMBODIMENT

First Embodiment

Figure 1:
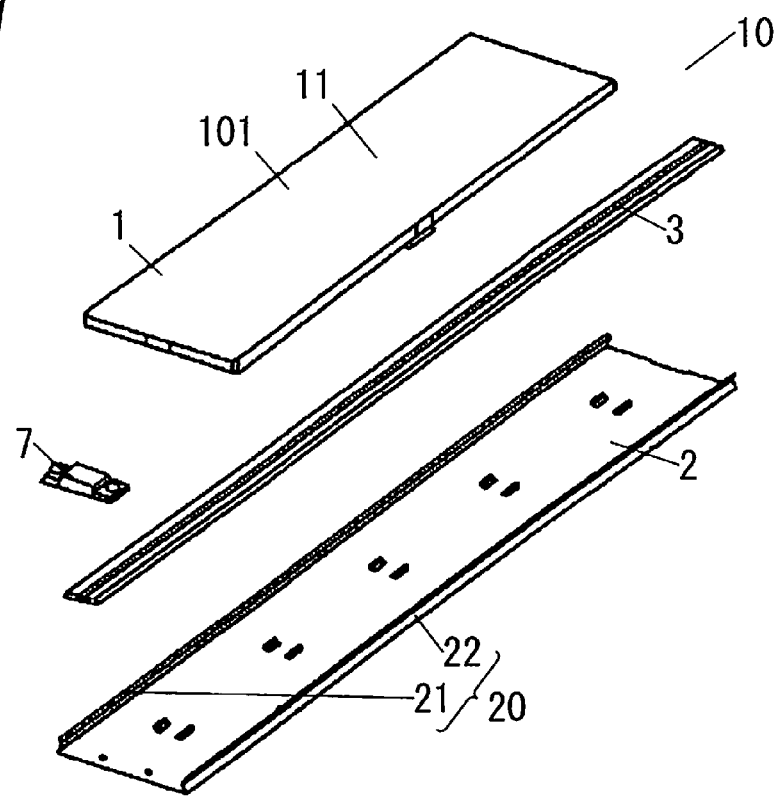
FIG. 1 is an exploded perspective view of a lighting apparatus according to a first embodiment.
Figure 2:
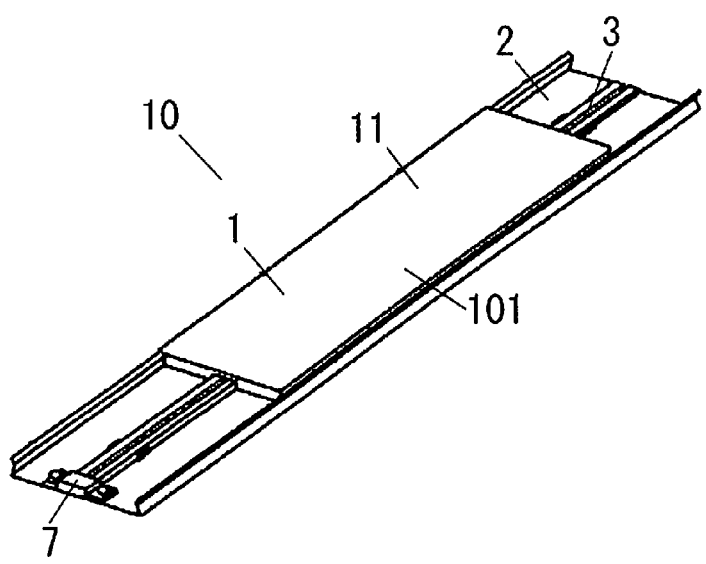
FIG. 2 is a perspective view of the lighting apparatus according to the first embodiment.
Figure 3:
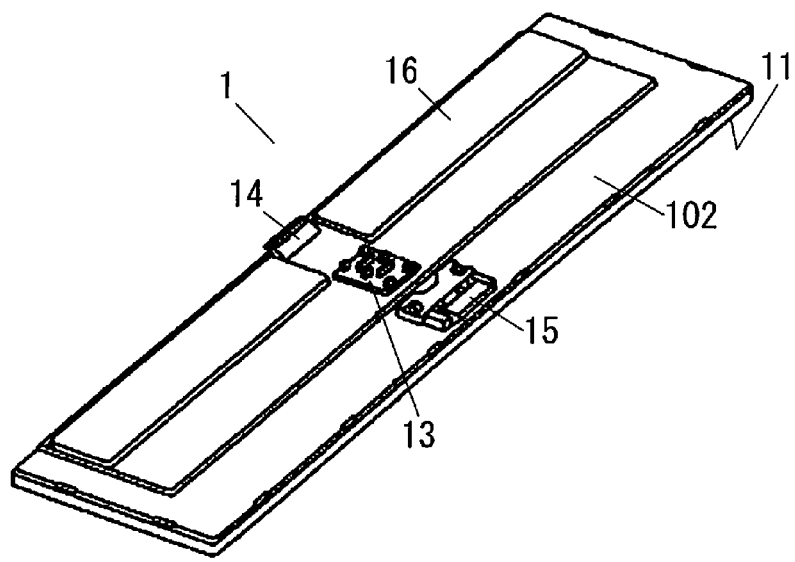
FIG. 3 is a perspective view of a light-emission unit of the lighting apparatus according to the first embodiment as viewed from an attachment surface side of the light-emission unit.

A lighting apparatus according to a first embodiment is described with reference to attached drawings. FIG. 1 is an exploded perspective view of a lighting apparatus 10, which includes a light-emission unit 1 and a base unit 2, according to the embodiment. FIG. 2 is a perspective view of the lighting apparatus 10 according to the embodiment in which the light-emission unit 1 is attached to the base unit 2. FIG. 3 is a perspective view of the light-emission unit 1 of the lighting apparatus 10 according to the embodiment as viewed from an attachment surface (102) side.

As shown in FIG. 1, the lighting apparatus 10 includes: the light-emission unit 1 having flat plate shape; and the base unit 2 having substantially rectangular shape. The light-emission unit 1 includes an organic electroluminescence device as a light source. The base unit 2 is configured to be detachably attached thereto the light-emission unit 1. The light-emission unit 1 has a front surface as a light emission surface 101 from which the light is emitted, and a back surface as the attachment surface 102 on which the base unit 2 is attached. The base unit 2 is shaped like substantially rectangle so as to have a pair of long sides (a first long side and a second long side) substantially parallel to each other along the longitudinal direction. The base unit 2 includes: a power supply rail 3 for supplying electricity therethrough to the light-emission unit 1; a DC (direct current) terminal block 7 for connecting the power supply rail 3 and an electric wire from outside; and a support section 20 supporting the light-emission unit 1. The power supply rail 3 has rail-shape. The power supply rail 3 extends in the longitudinal direction of the base unit 2. The support section 20 includes: a holding element 21; and an engaging element 22, which are provided on the first long side and the second long side, respectively for supporting the light-emission unit 1.

The light-emission unit 1 includes: a luminescent panel 11; a control circuit 16 controlling lighting of the luminescent panel 11; a power supply connector 13 electrically connecting the control circuit 16 with the power supply rail 3; a held element 14 adapted to be held by the holding element 21; and an engaged element 15 adapted to be engaged with the engaging element 22.

The light-emission unit 1 is attached to the base unit 2 so that the luminescent panel 11 (the light emission surface 101) faces upside (i.e., the attachment surface 102 faces the base unit 2) by engaging the held element 14 and the engaged element 15 respectively with the holding element 21 and the engaging element 22 as shown in FIG. 2, thereby being electrically connected with the power supply rail 3.

The luminescent panel 11 includes an organic electroluminescence device as a light source. The luminescent panel 11 includes: a transparent substrate; a light emission section; and a cap shaped like a case for sealing therein the light emission section together with the substrate, in this order from the light emission surface (101) side. For example, the light emission section includes: a positive electrode formed of transparent conductive film; a light emission layer including organic luminescent material; and a light-reflective negative electrode, in this order from the substrate. The cap insulates the light emission section from outside air, especially moisture and oxygen, thereby preventing the light emission section from deteriorating.

The control circuit 16 controls supplying electricity to the light-emission unit 1 and lighting of the luminescent panel 11, (in response to a control signal from outside). The power supply rail 3 is provided on a center of a surface, facing the attachment surface 102 of the light-emission unit 1, of the base unit 2 so as to extend in the longitudinal direction of the base unit 2. The power supply rail 3 is adapted to transmit a control signal and electricity to the control circuit 16 through the power supply connector 13. The control signal may be transmitted: by means of superposing high-frequency signal on a DC current, i.e., power line communication (PLC); through wire communication using a communication wire provided inside the power supply rail 3; through wireless communication; or the like. The power supply rail 3 may be provided on a region of the surface, facing the attachment surface 102, of the base unit 2 other than the center. The power supply rail 3 may be provided an end of the long side of the base unit 2.

The DC terminal block 7 is detachably fixed to the power supply rail 3, by means of a screw, a depression-projection fitting structure, or the like. In the example shown in FIG. 2, the DC terminal block 7 is fixed at a longitudinal end of the base unit 2, and electrically connects the power supply rail 3 with an external power source. Circuit configuration for electrically connecting the lighting apparatus 10 with the external power source through the DC terminal block 7 is described later. The example shown in FIG. 2 includes a single DC terminal block 7 fixed at one longitudinal end of the base unit 2, but the embodiment is not limited thereto. The base unit 2 preferably includes DC terminal blocks 7 provided at both longitudinal ends of the base unit 2 if it is intended to couple a plurality of base units 2 with each other. This configuration enables to electrically connect the power supply rails 3 of adjacent base units 2 with each other through the DC terminal block 7, thereby reducing connection points which are to be connected to the external power source.

Figure 4:
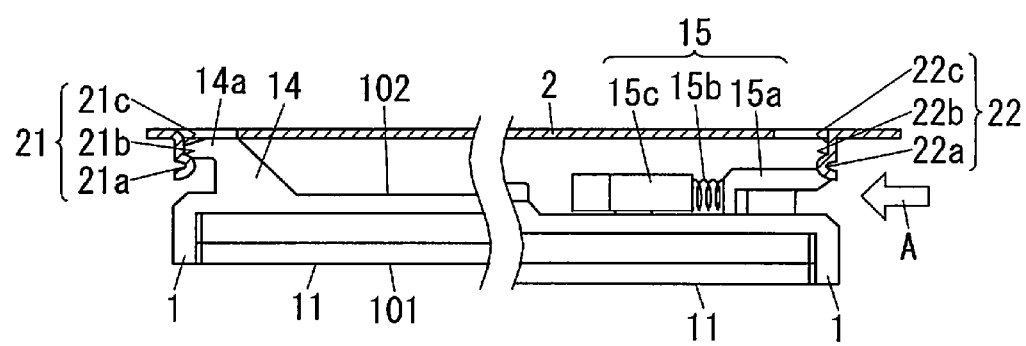
FIG. 4 is a schematic view around support section of the light-emission unit according to the first embodiment.

FIG. 4 is a schematic view illustrating an attachment structure of the lighting apparatus 10 of the light-emission unit 1 and the base unit 2, according to the embodiment. FIG. 4 is a side view of the lighting apparatus 10 as viewed from a longitudinal end of the base unit 2 during an attachment procedure of the light-emission unit 1 from lower side to the base unit 2 which has been installed on a ceiling.

The base unit 2 has a substantially rectangular shape so as to have the pair of long sides (the first long side and the second long side) which extend in the longitudinal direction of the base unit 2 and which oppose to each other. The holding element 21 is preferably provided at the first long side (one of the pair of long sides) of the base unit 2 continuously or discontinuously. The engaging element 22 is preferably provided at the second long side (the other of the pair of long sides) of the base unit 2 continuously or discontinuously. In the embodiment, the holding element 21 and the engaging element 22 are formed continuously on respective long sides of the base unit 2. The holding element 21 and the engaging element 22 are formed to have asymmetric shape with each other with respect to a center line in the longitudinal direction of the base unit 2. This configuration enables to prevent improper attachment of the light-emission unit 1 to the base unit 2, i.e., enables surely to attach the held element 14 and the engaged element 15 to the holding element 21 and the engaging element 22, respectively.

The holding element 21 includes: a protrusion 21a protruding inward; and a flat connection part 21c integrally connecting the protrusion 21a and a bottom surface of the base unit 2. A depression (a groove) 21b is thereby formed between the protrusion 21a and the connection part 21c. The holding element 21 is formed continuously in the longitudinal direction of the base unit 2. The light-emission unit 1 includes at least one held element 14, at a side of the light-emission unit 1 to be adjacent with the side of the base 2 at which the protrusion 21a is provided. The held element 14 is formed on the attachment surface 102, and includes a protrusion 14a protruding outside of the light-emission unit 1. The protrusion 14a is formed so as to be hooked with the depression 21b.

The engaging element 22 is formed on an opposite side of the base unit 2 to the side on which the holding element 21 is formed, and includes as similar with the holding element 21: a protrusion 22a protruding inward; and a flat connection part 22c integrally connecting the protrusion 22a and the bottom surface of the base unit 2. A depression (a groove) 22b is thereby formed between the protrusion 22a and the connection part 22c. The engaging element 22 is formed continuously in the longitudinal direction of the base unit 2. The light-emission unit 1 includes at least one engaged element 15, at a side of the light-emission unit 1 to be adjacent with the side of the base 2 at which the engaging element 22 is provided. The engaged element 15 is formed on the attachment surface 102, and includes: a movable protrusion 15a protruding outside of the light-emission unit 1; a fixed base 15c fixed on the attachment surface 102 of the light-emission unit 1; and a spring 15b fixed on the fixed base 15c and elastically biasing the movable protrusion 15a outside of the light-emission 1. The movable protrusion 15a is supported by the spring 15b and the fixed base 15c fixed on the attachment surface 102, thereby being movable (slidable) in a direction perpendicular to the side at which the engaged element 15 is provided. A length between the holding element 21 and the engaging element 22 (e.g., a length between the connection part 21c and the connection part 22c) of the base unit 2 is set slightly smaller than a length between a tip of the held element 14 and a tip of the engaged element 15 of a normal state of the spring 15 (i.e., state that the spring 15b is not expanded or contracted).

An attachment procedure of the light-emission unit 1 to the base unit 2 is explained next. Firstly, the light-emission unit 1 is positioned so that the attachment surface 102 faces the base unit 2 while being inclined to the base unit 2, and then the light-emission unit 1 is slidingly inserted into the base unit 2 so that the holding element 21 is positioned adjacent to the held element 14. As a result, the held element 14 is engaged with the holding element 21. That is, the protrusion 14a is hooked with the depression 21b.

Then, the engaged element (15) side of the light-emission unit 1 is turned around the held element (14) side so that the engaged element 15 of the light-emission unit 1 approaches the engaging element 22 of the base unit 2. As shown in FIG. 4, the movable protrusion 15a and the protrusion 22a have inclined surfaces, respectively. By applying an external force in a direction from the light-emission unit 1 to the base unit 2 (i.e., upward direction in FIG. 4), the inclined surfaces slides with each other, and thereby the movable protrusion 15a moves (slides) toward the fixed base 15c (i.e. moves in a direction of arrow "A" in FIG. 4) while compressing the spring 15b. The tip of the movable protrusion 15a then climbs over the protrusion 22a, and the movable protrusion 15a is hooked with the depression 22b, and thus the light-emission unit 1 is attached to the base unit 2. When the movable protrusion 15a is hooked with the depression 22b, the spring 15b elastically biases the movable protrusion 15a in the direction substantially perpendicular to the longitudinal direction of the base unit 2, toward the depression 22b. With this procedure, the light-emission unit 1 can be attached easily to the base unit 2.

In addition, the light-emission unit 1 can be easily detached from the base unit 2 by pulling the light-emission unit 1 in a direction away from the base unit 2 (i.e., lower direction in FIG. 4) with contracting the spring 15b with a tool or the like.

As described above, the lighting apparatus 10 of the embodiment having above described structure has advantages of easily attaching/detaching the light-emission unit 1 to/from the base unit 2 and therefore easily replacing the light-emission unit 1.

Figure 5:
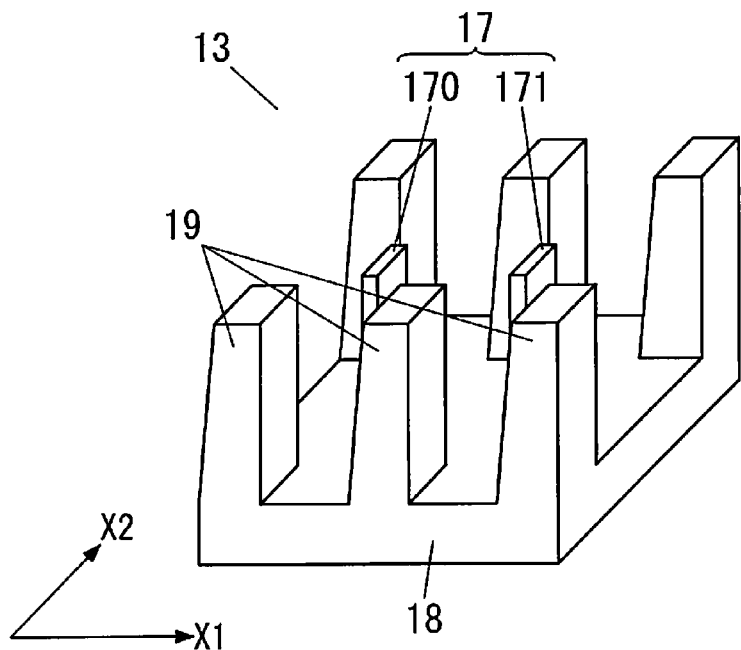
FIG. 5 is a schematic view of a power supply connector of the lighting apparatus according to the first embodiment.

FIG. 5 is an enlarged schematic view of the power supply connector 13 of the lighting apparatus 10 according to the embodiment. The power supply connector 13 includes: a flat plate-shaped fix part 18 having electrically insulation property; electrically conductive connection terminals 17; and clamp pieces 19 having electrically insulation property. The connection terminals 17 include an anode terminal 170 and a cathode terminal 171. The fix part 18 of the power supply connector 13 is fixed on a back side of the luminescent panel 11. Each of the clamp pieces 19 has a substantially square pillar shape and protrudes integrally from the fix part 18. The power supply connector 13 includes a plurality of ("six" in the embodiment) clamp pieces 19. The clamp pieces 19 are fitted with (i.e., sandwich and hold) the power supply rail 3 when the anode terminal 170 and the cathode terminal 171 are electrically connected with the power supply rail 3, thereby improving reliability of physical connection between the power supply connector 13 and the power supply rail 3.

As shown in FIG. 5, the connection terminals 17 and the clamp pieces 19 protrude in a same direction (upward in FIG. 5) from the fix part 18, and are elongated in a same direction (in a direction X2 of FIG. 5) along a plane of the fix part 18. The anode terminal 170 and the cathode terminal 171 are arranged side by side along the direction X1 (see FIG. 5). The plurality of clamp pieces 19 include two pairs of three clamp pieces 19, and the two pairs of clamp pieces 19 are arranged alternately with the connection terminals 17 in the direction X2. The three clamp pieces 19 of each pair are arranged side by side in the direction X1 (which is perpendicular to the direction X2) with spacing a predetermined interval. With regard to each pair, the three clamp pieces 19 and the connection terminals 17 (the anode terminal 170 and the cathode terminal 171) are arranged alternately with each other in the direction X1. The power supply connector 13 is arranged in the light-emission unit 1 so that the direction X2 corresponds to the longitudinal direction of the base unit 2 (i.e., extending direction of the power supply rail 3) when the light-emission unit 1 is attached to the base unit 2.

Figure 6:
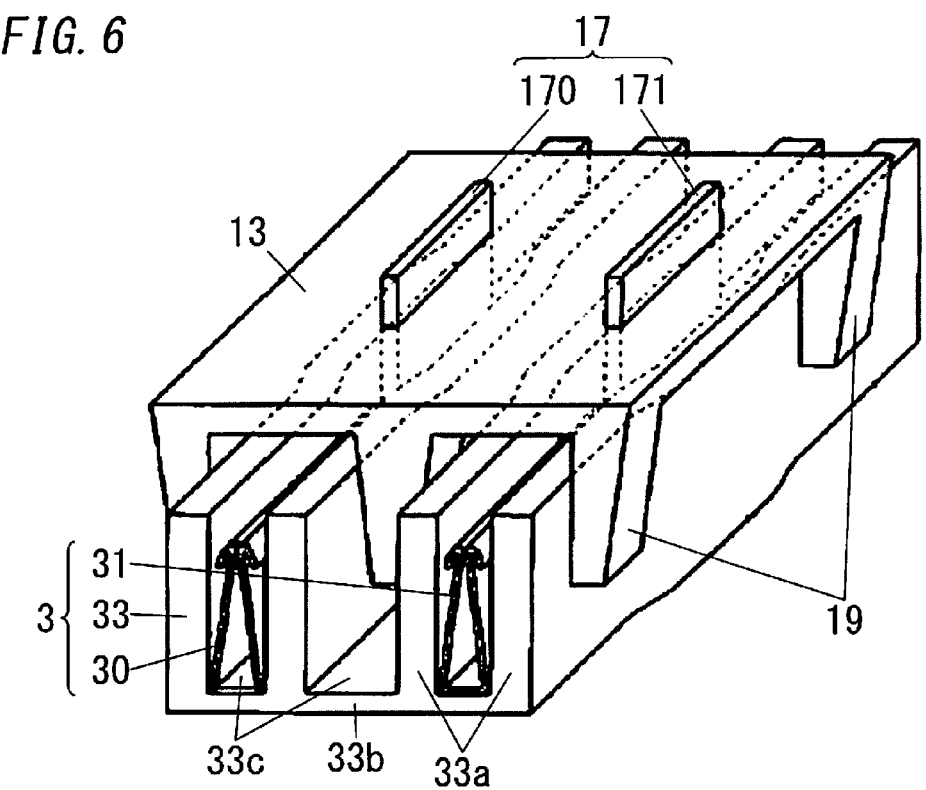
FIG. 6 is an explanatory view illustrating the connection between the power supply connector and a power supply rail of the lighting apparatus according to the first embodiment.

A connection structure between the power supply connector 13 and the power supply rail 3 is described next. FIG. 6 is an enlarged schematic view showing a connection point between the power supply connector 13 and the power supply rail 3 of the lighting apparatus 10 according to the embodiment. The power supply rail 3 includes: an anode rail 30; a cathode rail 31; and a cover rail 33, each extending in the longitudinal direction of the base unit 2. The cover rail 33 has electrically insulation property, and holds therein the anode rail 30 and the cathode rail 31. Specifically, the cover rail 33 includes a plurality of side walls 33a; and a bottom wall 33b, each extending in the longitudinal direction, and thereby a plurality of grooves 33c are formed between the bottom wall 33b and each two side walls 33a. The anode rail 30 and the cathode rail 31 are housed in different grooves 33c so as to be insulated from each other. Each of the anode rail 30 and the cathode rail 31 is formed of a conductive metal plate e.g., a copper plate. At least a part ("whole" in the embodiment) of the anode rail 30 and at lease a part ("whole" in the embodiment) of the cathode rail 31 are exposed toward the power supply connector 13, and the exposed portions serve as power supply points for supplying electricity to the power supply connector 13.

As shown in FIG. 6, the power supply connector 13 is arranged in the light-emission unit 1 so that: the connection terminals 17 (the anode terminal 170 and the cathode terminal 171) are respectively inserted in the anode rail 30 and the cathode rail 31; and each clamp piece 19 is inserted in a corresponding groove 33c of the cover rail 33 or is positioned outside of the cover rail 33, when the light-emission unit 1 is attached to the base unit 2.

Figure 7:
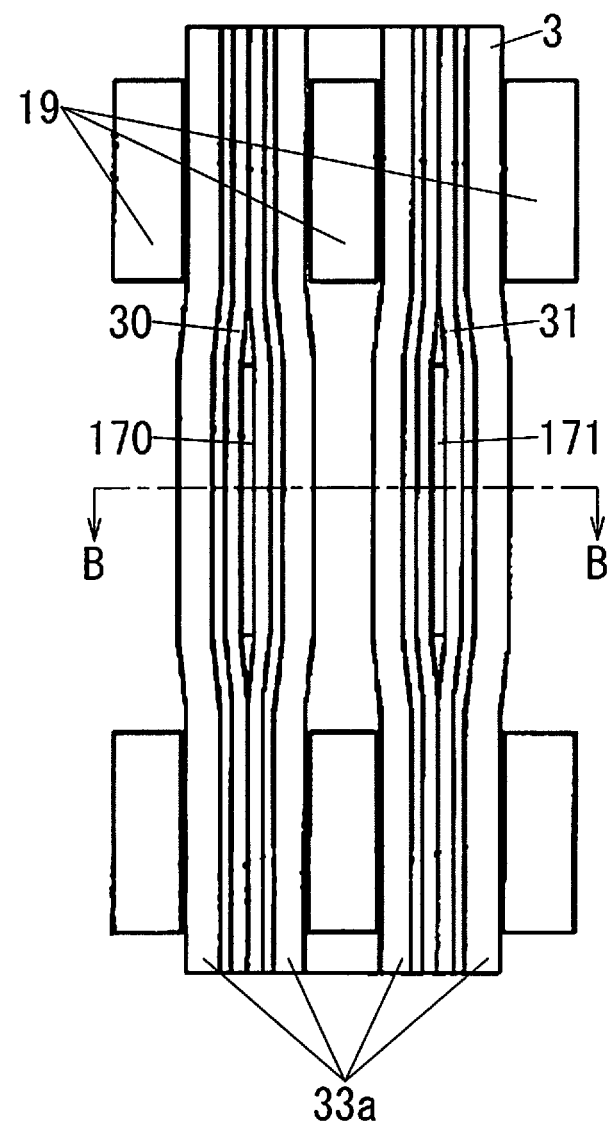
FIG. 7 is an explanatory planar view illustrating the connection between the power supply connector and the power supply rail of the lighting apparatus according to the first embodiment.
Figure 8:
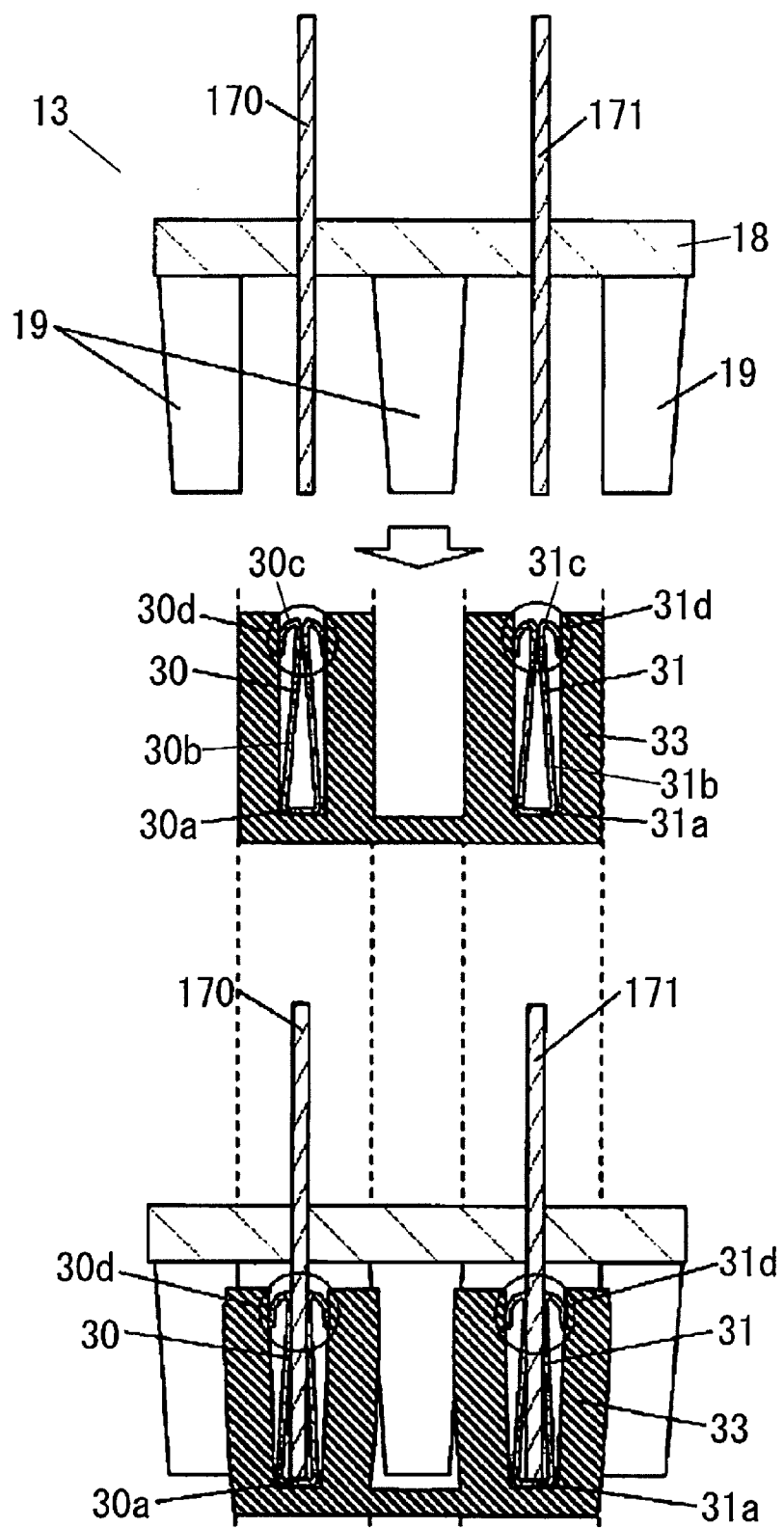
FIG. 8 is an explanatory sectional view, taken along a line B-B of FIG. 7, for illustrating a connection procedure between the power supply connector and the power supply rail of the lighting apparatus according to the first embodiment.

FIG. 7 is a schematic planar view showing a connection point between the power supply connector 13 and the power supply rail 3 of the lighting apparatus 10 according to the embodiment. FIG. 8 is an explanatory view for illustrating a connection procedure between the power supply connector 13 and the power supply rail 3 taken along a line B-B of FIG. 7. Each of the anode rail 30 and the cathode rail 31 is made by bending a conductive plate having elasticity, and is disposed in a corresponding groove 33c of the cover rail 33.

Specifically, the anode rail 30 includes: a base portion 30a extending in the longitudinal direction of the base unit 2; plate portions 30b bent to be upstanding from both long sides of the base portion 30a; and spring portions 30c formed by bending outward the tops of the plate portions 30b. The cathode rail 31 includes, as with the anode rail 30: a base portion 31a extending in the longitudinal direction of the base unit 2; plate portions 31b upstanding from both long sides of the base portion 31a; and spring portions 31c formed by bending the top of the plate portions 31b outward. The anode rail 30 and the cathode rail 31 are placed in the respective grooves 33c of the cover rail 33 so that the base portions 30a, 31a face the bottoms of the respective grooves 33c, so that the tops (open ends) of the plate portions 30b, 31b serve as terminal receptors 30d, 31d for elastically holding the anode rail 30 and the cathode rail 31, respectively.

For attaching the power supply connector 13 to the power supply rail 3, firstly the clamp pieces (19) side of the power supply connector 13 faces the groove (33c) side of the cover rail 33 of the power supply rail 3, and then the power supply connector 13 is inserted into the power supply rail 3 in a direction of an arrow shown in FIG. 8. In this time, pairs of side walls 33a, which the anode rail 30 or the cathode rail 31 is interposed therebetween, are held (clamped) by a paired clamp pieces 19; and the anode terminal 170 and the cathode terminal 171 are held (clamped) by the terminal receptors 30d, 31d, respectively, so that the power supply connector 13 is fitted to the power supply rail 3.

The anode rail 30 is electrically connected to the anode terminal 170 by elastically holding the anode terminal 170 with its own terminal receptor 30d, and the cathode rail 31 is electrically connected to the cathode terminal 171 by elastically holding the cathode terminal 171 with its own terminal receptor 31d.

As shown in FIG. 7, the anode rail 30 is made widened (enlarged) its width by elastically holding the anode terminal 170 (i.e., by being inserted the anode terminal 170), and the cathode rail 31 is made widened (enlarged) its width by elastically holding the cathode terminal 171 (i.e., by being inserted the cathode terminal 171). Note that, as shown in FIG. 7, the clamp pieces 19 are provided at positions of both sides of the connection terminals 17 in the extending direction of the power supply rail 3 (so as to be interposed the connection terminal 17 therebetween). Therefore, the clamp pieces 19 are configured to hold the cover rail 33, at both some distant positions in the longitudinal direction from a position where the width of the cover rail 33 is widened by inserting the connection terminals 17 into the anode rail 30 or the cathode rail 31.

The cover rail 33 of the embodiment includes three grooves (side grooves and a center groove) 33c, and the anode rail 30 and the cathode rail 31 are disposed (housed) in the respective side grooves 33c. Each of the paired clamp pieces 19 holds (clamps) two side walls 33a of a side groove 33c from the center groove (33c) side and the outside of the cover rail 33, respectively, when the power supply connector 13 is connected to the power supply rail 3. This configuration enables to surely couple the power supply connector 13 with the power supply rail 3. The clamp piece 19 may be formed to have a width, in a direction perpendicular to the longitudinal direction of the base unit, which is smaller toward the bottom of the groove 33c of the power supply rail 3 (see FIG. 6). This configuration improves reliability of fitting the power supply connector 13 to the power supply rail 3.

Figure 9:
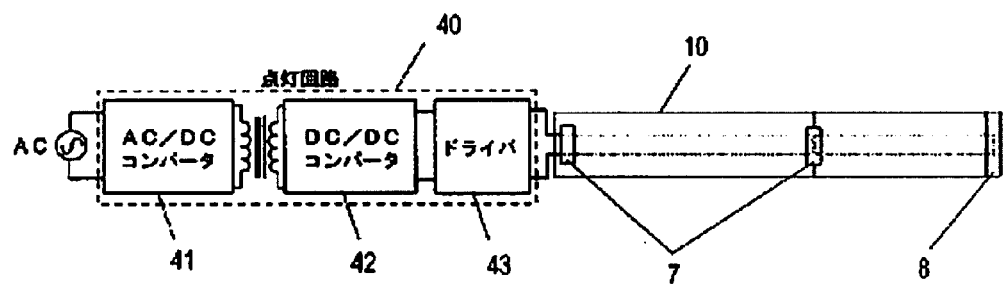
FIG. 9 is a schematic circuit diagram of a lighting circuit and the lighting apparatus according to the first embodiment.

FIG. 9 is a schematic circuit diagram of a lighting circuit 40 and the lighting apparatus 10. The DC terminal block 7 is connected to the lighting circuit 40. The lighting circuit 40 includes: an AC-DC converter 41 converting an AC (alternating current) voltage from commercial power source into a DC (direct current) voltage; a DC-DC converter 42 converting a DC voltage from the AC-DC converter 41 into a desired DC voltage; and a driver 43 regulating power supply of the converted voltage to the lighting apparatus 10. The AC-DC converter 41, the DC-DC converter 42, and the driver 43 are installed in a ceiling or a wall on which the lighting apparatus 10 is installed.

The direct current from the driver 43 is supplied to the DC terminal block 7, the power supply rail 3, and an endcap 8 in this order. The endcap 8 is configured to be detachably fixed to the base unit 2, as with the DC terminal block 7. The endcap 8 is attached at an end of a lighting apparatus 10, or an end of a serially connected lighting apparatuses 10. The endcap 8 is adapted: to electrically connect the anode terminal 170 and the cathode terminal 171 of the power supply connector 13 of the light-emission unit 1; or to include conductive bodies that are respectively connected with the anode terminal 170 and the cathode terminal 171 so as to be connected to another lighting apparatus. The conductive body may be formed of: a lead wire; a conductive metal plate which is coated with insulation material at regions other than connection points to be connected to the anode terminal 170 or the cathode terminal 171; or the like. In the embodiment, the end cap 8 electrically connects the anode rail 30 and the cathode rail 31 e.g., through a built-in resistor.

For attaching the lighting apparatus 10 of above structure to a building products, firstly the base unit 2 having arbitrary length is installed on a wall or a ceiling. Note that, a plurality of lighting apparatuses 10 can be arranged freely, and may be electrically connected with each other to form a lighting apparatus assembly (a lighting apparatus system). For example, a plurality of base units 2 may be arranged serially in the longitudinal direction to be electrically connected with each other. In this case, power supply rails 3 of adjacent base units 2 may be serially connected electrically with each other by means of a DC terminal block 7.

Under the condition where the base unit 2 is installed on a wall and/or ceiling, a plurality of light-emission units 1 can be arranged in desirable positions. That is, the light-emission unit 1 can be electrically connected to any point of the power supply rail 3. Therefore, a user can easily attach the light-emission unit 1 at an arbitrary position. The lighting apparatus 10 of the embodiment therefore has a higher degree of freedom for arrangement and is excellent in design.

Note that, installation direction of the lighting apparatus 10 is not limited, and the lighting apparatus 10 can be arranged on a wall or ceiling in any angle. For example, the base unit 2 may be installed so that the longitudinal direction thereof corresponds to the horizontal direction, or may be installed so that the longitudinal direction thereof corresponds to the vertical direction. In a case where the base unit 2 is installed on a wall so that the longitudinal direction thereof corresponds to the horizontal direction, the light-emission unit 1 can be arranged at arbitrary position along the horizontal direction.

When the base unit 2 is installed so that the longitudinal direction thereof corresponds to the vertical direction, there is a possibility of positional displacement of the light-emission unit 1 due to its own weight. However, the lighting apparatus 10 of the embodiment enables to prevent the positional displacement of the light-emission unit 1 with respect to the base unit 2 in the vertical direction, since the power supply rail 3 is held (clamped) by a plurality of clamp pieces 19 of the power supply connector 13. In detail, the anode terminal 170 is held by the anode rail 30, and the cathode terminal 171 is held by the cathode rail 31. In addition, the cover rail 33 is held by the clamp pieces 19 at positions where an enlarged (widened) position of the cover rail 33 (by being inserted the anode terminal 170 or the cathode terminal 171 into the terminal receptor 30*d*, 31*d*) is located therebetween in the vertical direction. As a result, the embodiment enables to reliably prevent positional displacement of the light-emission unit 1 in the vertical direction. Thus, this configuration enables to have higher degree of freedom of arrangement and improve the reliability of connection between the light-emission unit 1 and the base unit 2.

The lighting apparatus 10 may further includes a cover (as a dummy) attached to the base unit 2 so as to cover an exposed region at which the light-emission unit 1 is not attached. The cover can prevent the power supply rail 3 from being bared. The cover enables to give a superior appearance of the lighting apparatus 10, and to prevent the power supply rail 3 from damaged due to external factor.

The base unit 2 is preferably has a longitudinal length that is integer multiple of a length of a side, which is aligned with the long side of the base unit 2, of the light-emission unit 1. With this configuration, the light-emission unit(s) 1 can be just attached to the base unit 2 without surplus portion, and it is convenient for the installation of the lighting apparatus(es) 10.

The base unit 2 is preferably has a width (i.e., a short side length) that is substantially same with a length of a side, which is aligned with the short side of the base unit 2, of the light-emission unit 1. This configuration enables to reduce such a region from which no light is emitted, if a plurality of lighting apparatuses 10 are arranged in an array.

As shown in FIG. 1, the base unit 2 may be opened in at least one end in the longitudinal direction thereof. With this configuration, a single light-emission unit 1 can be attached across over a plurality of base unit 2. This configuration therefore enables to give a higher degree of freedom for arrangement of the light-emission unit 1 to the base unit 2, and is excellent in design.

The light-emission unit 1 of the embodiment has a rectangle shape as shown in FIG. 1, but may have other shape e.g. square shape, or the like. The luminescent panel 11 is not limited to the organic electroluminescence device, and may be another light source such as combination of an LED chip and a light guide panel.

Second Embodiment

Figure 10:
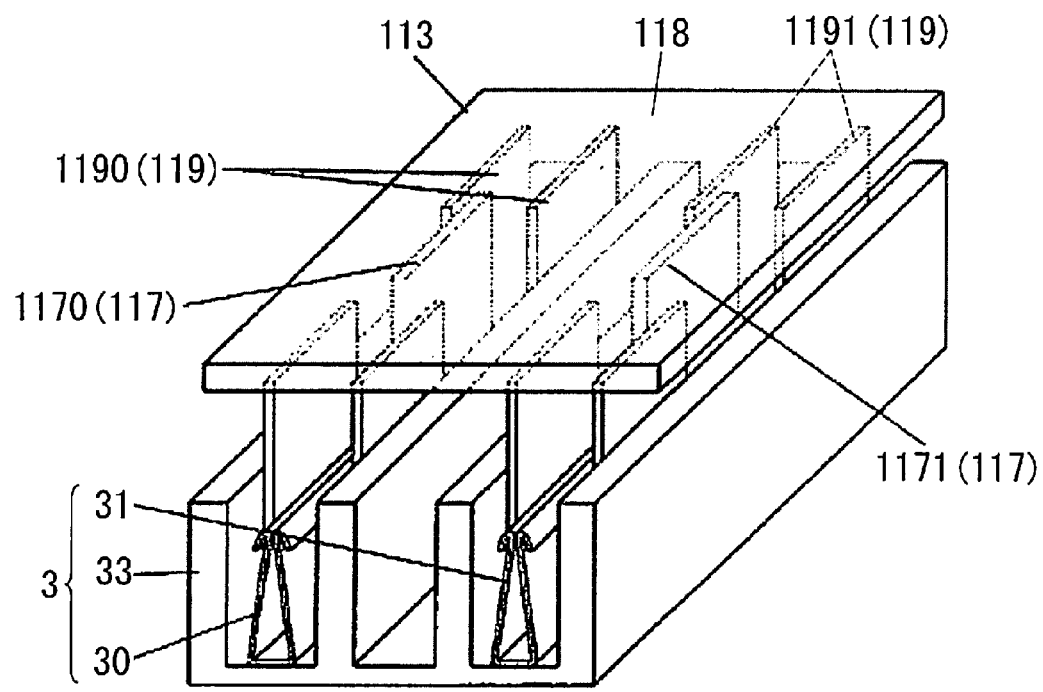
FIG. 10 is an explanatory view illustrating the connection between a power supply connector and a power supply rail of a lighting apparatus according to a second embodiment.

A lighting apparatus 10 according to a second embodiment is described with reference to attached drawings. FIG. 10 is an enlarged schematic view showing a connection point between a power supply connector 113 and a power supply rail 3 of the lighting apparatus 10 according to the embodiment. The lighting apparatus 10 of the embodiment has substantially same configuration with the lighting apparatus 10 of the first embodiment, and differs from the first embodiment in that it has a power supply connector 113 as substitute for the power supply connector 13.

The power supply connector 113 of the embodiment includes: a flat plate-shaped fix part 118 having electrically insulation property; electrically conductive connection terminals 117; and clamp pieces 119 having electrically insulation property. The connection terminals 117 include an anode terminal 1170 and a cathode terminal 1171. As described above, in the first embodiment, the clamp pieces 19 of the power supply connector 13 hold (clamp) the side walls 33a of the cover rail 33. On the contrary, in the embodiment, the clamp pieces 119 of the power supply connector 113 hold (clamp) an anode rail 30 and a cathode rail 31, respectively. For example, the clamp pieces 119 includes: two pairs of anode clamp pieces 1190 arranged so as to be interposed the anode terminal 1170 (held by the anode rail 30) therebetween along the extending direction of a power supply rail 3; and two pairs of cathode clamp pieces 1191 arranged so as to be interposed the cathode terminal 1171 (held by the cathode rail 31) therebetween along the extending direction of the power supply rail 3, as shown in FIG. 10. Each of the anode clamp pieces 1190 is inserted between a side wall 33a of the cover rail 33 and the anode rail 30, so that each paired anode clamp pieces 1190 elastically holds (clamps) the anode rail 30 therebetween. Each of the cathode clamp pieces 1191 is inserted between a side wall 33a of the cover rail 33 and the cathode rail 31, so that each paired cathode clamp pieces 1191 elastically holds (clamps) the cathode rail 31 therebetween.

Figure 11:
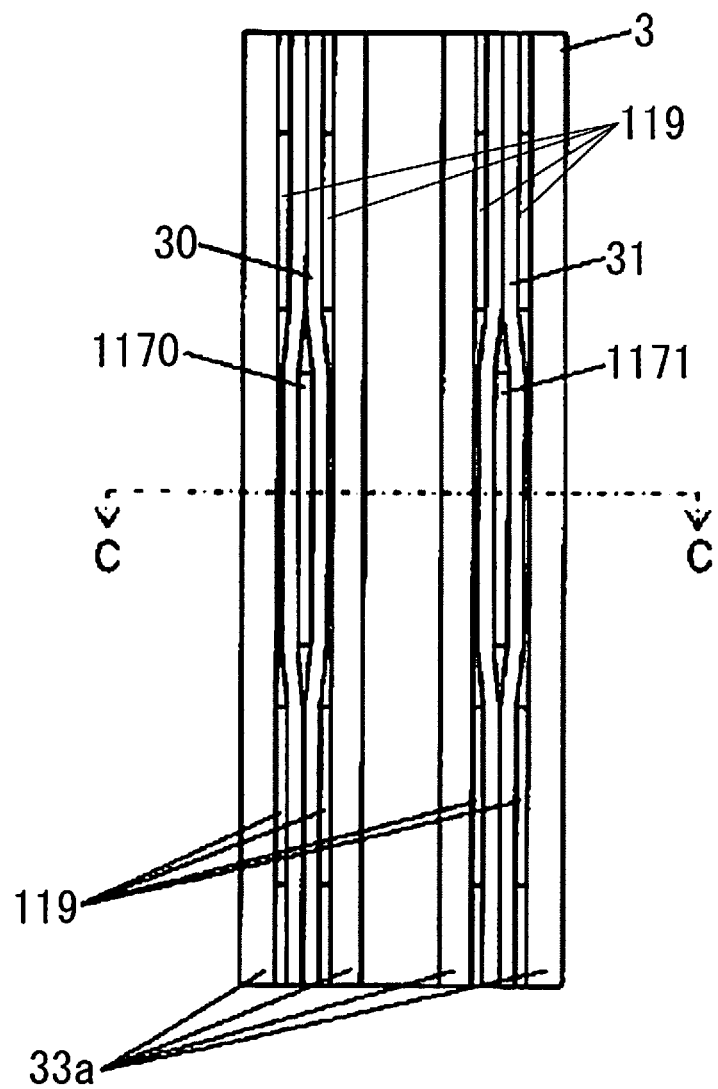
FIG. 11 is an explanatory planar view illustrating the connection between the power supply connector and the power supply rail of the lighting apparatus according to the second embodiment.
Figure 12:
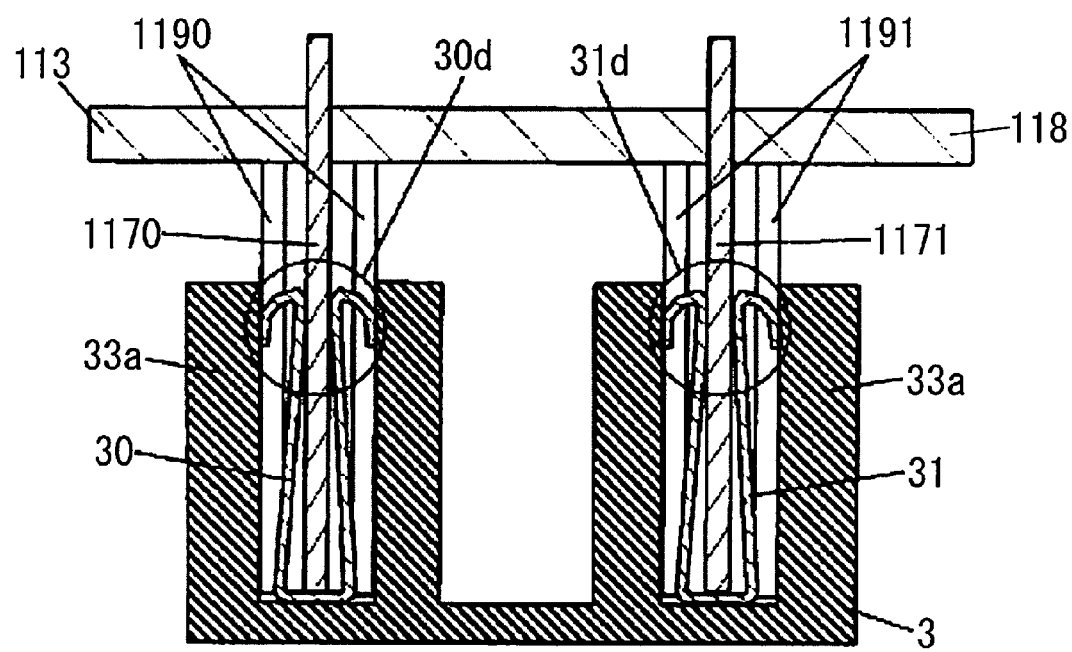
FIG. 12 is an explanatory sectional view, taken along a line C-C of FIG. 11, for illustrating a connection procedure between the power supply connector and the power supply rail of the lighting apparatus according to the second embodiment.

FIG. 11 is a schematic planar view showing a connection point between the power supply connector 113 and the power supply rail 3 of the lighting apparatus 10 according to the embodiment. FIG. 12 is a schematic sectional view taken along a line C-C of FIG. 11. The anode rail 30 is made widened its width by elastically holding the anode terminal 1170, and the cathode rail 31 is made widened its width by elastically holding the cathode terminal 1171 (see FIG. 11). Note that, as shown in FIG. 11, the clamp pieces 119 are provided at positions of both sides of the connection terminals 117 in the extending direction of the power supply rail 3 (so as to be interposed the connection terminals 117 therebetween). Therefore, the anode clamp pieces 1190 hold the anode rail 30 at both some distant positions in the longitudinal direction from a position where the width of the anode rail 30 is widened by inserting the anode terminal 1170 into the anode rail 30, and the cathode clamp pieces 1191 hold the cathode rail 31 at both some distant positions in the longitudinal direction from a position where the width of the cathode rail 31 is widened by inserting the cathode terminal 1171 into the cathode rail 31.

With this configuration, even when a base unit 2 is installed so that the longitudinal direction thereof corresponds to the vertical direction, the lighting apparatus 10 of the embodiment enables to prevent a positional displacement of a light-emission unit 1 with respect to the base unit 2 in the vertical direction, since the power supply rail 3 is held (clamped) by a plurality of clamp pieces 119 (1190, 1191) of the power supply connector 113. In detail, the anode terminal 1170 is held by the anode rail 30, and the cathode terminal 1171 is held by the cathode rail 31. In addition, the anode rail 30 is held by the anode clamp pieces 1190 at positions where an enlarged (widened) position of the anode rail 30 (by being inserted the anode terminal 1170 into a terminal receptor 30d) is located therebetween in the vertical direction; and the cathode rail 31 is held by the cathode clamp pieces 1191 at positions where an enlarged (widened) position of the cathode rail 31 (by being inserted the cathode terminal 1171 into a terminal receptor 31d) is located therebetween in the vertical direction. As a result, the embodiment reliably prevents positional displacement of the light-emission unit 1 in the vertical direction. This configuration enables to have higher degree of freedom of arrangement and improve the reliability of connection between the light-emission unit 1 and the base unit 2.

The plurality of clamp pieces 119 of the embodiment may be made of conductive material. This configuration enables to enhance the reliability of electrical connection between the light-emission unit 1 and the base unit 2 in addition to the reliability of physical connection therebetween.

Other configurations of the embodiment is similar with those of the first embodiment, and therefore the embodiment has similar advantages with those of the first embodiment.

Third Embodiment

Figure 13:
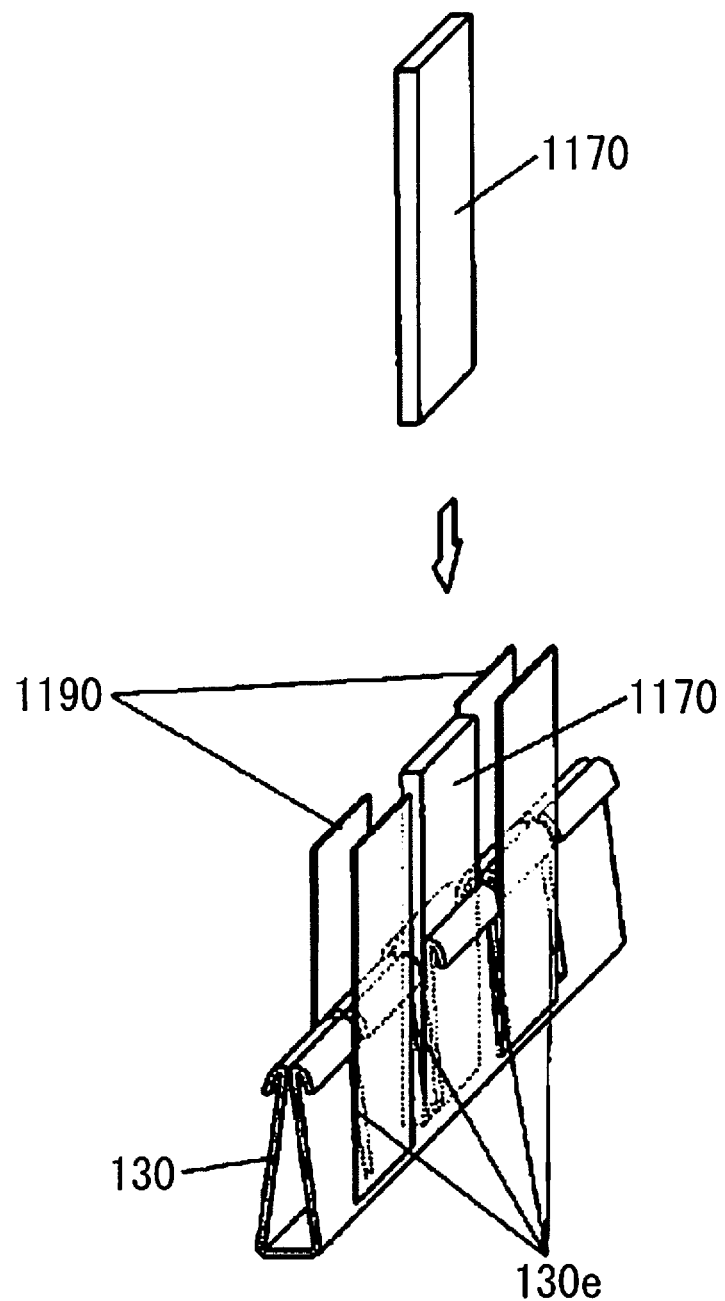
FIG. 13 is an explanatory view for illustrating the connection of an anode rail with an anode terminal and clamp pieces of a lighting apparatus according to third embodiment.

A lighting apparatus 10 according to a third embodiment is described with reference to attached drawings. FIG. 13 is a perspective view showing the connection of an anode rail 130 to an anode terminal 1170 and anode clamp pieces 1190 of the lighting apparatus 10 of the embodiment. The lighting apparatus 10 of the embodiment has substantially same configuration with the lighting apparatus 10 of the second embodiment, and differs from the second embodiment in that it has an anode rail 130 and a cathode rail 131, as substitute for the anode rail 30 and the cathode rail 31. Note that, a cathode rail 131, a cathode terminal 1171 and cathode clamp pieces 1191 have similar structures with the anode rail 130, the anode terminal 1170 and the anode clamp pieces 1190, and therefore detailed explanations thereof are omitted.

The anode rail 130 of the embodiment has a plurality of slits 130e. Each slit 130e extends in a direction perpendicular to the extending direction of the anode rail 130, i.e., extends in an inserting direction of the anode terminal 1170 and the clamp pieces 1190 into the anode rail 130.

When the power supply connector 113 is inserted into the power supply rail 3, a part of the anode rail 130 into which the anode terminal 1170 is inserted is opened (bent) outward due to the slits 130e, and the clamp pieces 1190 hold the anode rail 130 at both side positions (distant in the longitudinal direction of the power supply rail 3).

The plurality of slits 130e are spaced with each other at a predetermined interval in the longitudinal direction of the anode rail 130. It is preferable that the anode terminal 1170 has a width, in the longitudinal direction of the base unit 2, which is equal to the integer multiple of the interval between the adjacent slits 130e. It is preferable that the power supply connector 13 is positioned with respect to the power supply rail 3 so that "a space" between a clamp piece 1190 and the anode terminal 1170 corresponds to "a slit 130e" when the light-emission unit 1 is attached to the base unit 2. With this configuration, when the anode terminal 1170 is inserted into the anode rail 130, only a part of the anode rail 130 corresponding to the anode terminal 1170 is opened outward. As a result, the clamp pieces 1190 can be designed to locate close to the anode terminal 1170, and therefore the clamp pieces 1190 can hold the anode rail 130 at positions near the opened part of the anode rail 130.

In addition, when the base unit 2 is installed so that the longitudinal direction thereof corresponds to the vertical direction, the opened part of the anode rail 130 will be caught by the clamp pieces 1190 even if the light-emission unit 1 slides down along the vertical direction. Therefore, this configuration enables to surely prevent the light-emission unit 1 from being displaced even when the base unit 2 is arranged vertically.

The anode terminal 1170 may have a thickness portion at a position to be held by (the terminal receptor 30d of) the anode rail 130. This configuration enables to increase the elastic force applied by the anode rail 130 for holding the anode terminal 1170, and thus to surely prevent the light-emission unit 1 from being displaced downward, because the anode rail 130 is opened more widely by the thickness portion of the anode terminal 1170.

Other configurations of the embodiment is similar with those of the first or second embodiment, and therefore the embodiment has similar advantages with those of the first and second embodiment.

The invention claimed is:
1. A lighting apparatus comprising:
a light-emission unit having plate shape; and
a base unit configured to be detachably attached thereto the light-emission unit, the base unit having substantially rectangular shape,
wherein the base unit comprises:
a power supply rail for supplying electricity to the light-emission unit, the power supply rail having rail-shape and extending in a longitudinal direction of the base unit; and
a support section supporting the light-emission unit,
wherein the light-emission unit comprises:
a luminescent panel;
a control circuit configured to control lighting of the luminescent panel; and
an electrically conductive connection terminal electrically connecting the control circuit to the power supply rail,
wherein the base unit is formed so as to be capable of being attached thereto a plurality of the light-emission units along the longitudinal direction of the base unit, and
wherein the connection terminal is connected to an arbitrary point of the rail-shaped power supply rail,
wherein the light-emission unit comprises a power supply connector that has: the connection terminal; and a plurality of clamp pieces holding therebetween a part of the power supply rail,
wherein the plurality of clamp pieces holds the power supply rail and the connection terminal is connected to the power supply rail, so that the light-emission unit is attached to the base unit,
wherein the power supply rail comprises: at least an electrically conductive terminal rail electrically connected to the connection terminal; and an electrically insulating cover rail housing the terminal rail, and
wherein:
the clamp pieces hold the cover rail at positions on both sides, in the longitudinal direction of the cover rail, of a position where the width of the cover rail is increased as a result of insertion of the connection terminal into the terminal rail, or
the clamp pieces hold the terminal rail at positions on both sides, in the longitudinal direction of the terminal rail, of a position where the width of the terminal rail is increased as a result of insertion of the connection terminal into the terminal rail.
2. The lighting apparatus as set forth in claim 1,
wherein the base unit has substantially rectangular shape so as to have a first long side and a second long side along the longitudinal direction thereof,
wherein the support section comprises a holding element and an engaging element,
wherein the holding element is provided at a side of the first long side continuously or discontinuously,
wherein the engaging element is provided at a side of the second long side continuously or discontinuously,
wherein the light-emission unit comprises a held element held by the holding element and an engaged element engaged with the engaging element, and
wherein the engaged element is elastically biased in a direction substantially perpendicular to the longitudinal direction of the base unit at the side of the second long side, so that the engaged element is engaged with the engaging element.
3. The lighting apparatus as set forth in claim 2, wherein the holding element and the engaging element are formed to have asymmetric shape with each other with respect to a center line in the longitudinal direction of the base unit.
4. The lighting apparatus as set forth in claim 2, wherein the base unit has a length equal to the integer multiple of a length of the light-emission unit in the longitudinal direction.
5. The lighting apparatus as set forth in claim 1,
wherein the connection terminal comprises: an anode terminal; and a cathode terminal,
wherein the terminal rail comprises: an electrically conductive anode rail electrically connected to the anode terminal; and an electrically conductive cathode rail electrically connected to the cathode terminal,
wherein the cover rail has a plurality of grooves extending in the longitudinal direction of the base unit and housing therein the anode rail and the cathode rail so as to be insulated from each other, and
wherein the plurality of clamp pieces holds the cover rail in which the anode rail and the cathode rail are housed so that the clamp pieces hold the cover rail at positions on both sides, in the longitudinal direction of the cover rail, of a position where the width of the cover rail is increased as a result of insertion of the anode terminal or the cathode terminal into the terminal rail.
6. The lighting apparatus as set forth in claim 1,
wherein the connection terminal comprises: an anode terminal; and a cathode terminal,
wherein the terminal rail comprises: an electrically conductive anode rail electrically connected to the anode terminal; and an electrically conductive cathode rail electrically connected to the cathode terminal,
wherein the cover rail has a plurality of grooves extending in the longitudinal direction of the base unit and housing therein the anode rail and the cathode rail so as to be insulated from each other, and
wherein the plurality of clamp pieces hold the anode rail and the cathode rail, respectively so that the clamp pieces hold the anode rail at positions on both sides, in the longitudinal direction of the anode rail, of a position where the width of the anode rail is increased as a result of insertion of the anode terminal into the anode rail as well as the clamp pieces holding the cathode rail at positions on both sides, in the longitudinal direction of the cathode rail, of a position where the width of the cathode rail is increased as a result of insertion of the cathode terminal into the cathode rail.
7. The lighting apparatus as set forth in claim 6, wherein the plurality of clamp pieces are made of conductive material.
8. The lighting apparatus as set forth in claim 1,
wherein the terminal rail is made by bending a conductive plate having elasticity and has a plurality of slits extending in a depth direction of the groove.
9. The lighting apparatus as set forth in claim 8,
wherein the plurality of slits are spaced with each other at a predetermined interval, and
wherein the connection terminal has a width, in the longitudinal direction of the base unit, which is equal to the integer multiple of the interval between adjacent slits.
10. The lighting apparatus as set forth in claim 5, wherein the clamp piece has a thickness, in a direction perpendicular to the longitudinal direction of the base unit, which is smaller toward a bottom of the power supply rail.

11. The lighting apparatus as set forth in claim 6, wherein the clamp piece has a thickness, in a direction perpendicular to the longitudinal direction of the base unit, which is smaller toward a bottom of the power supply rail.

12. The lighting apparatus as set forth in claim 1,
wherein the light-emission unit has: a front surface that constitutes a light emission surface; and a back surface that constitutes an attachment surface, and
wherein the power supply connector is provided on the attachment surface.

13. The lighting apparatus as set forth in claim 1, wherein the power supply rail further comprises a communication wire transmitting therethrough a control signal to the control circuit.

14. The lighting apparatus as set forth in claim 1, wherein the light-emission unit includes an organic electroluminescence device as a light source.

15. A lighting apparatus assembly formed by connecting a plurality of the lighting apparatuses as set forth in claim 1.

* * * * *